(12) United States Patent
Brazeau

(10) Patent No.: US 7,757,585 B2
(45) Date of Patent: Jul. 20, 2010

(54) TIRE REPAIR TOOLS

(76) Inventor: Russell J. Brazeau, W172 N8688 Shady La., Menomonee Falls, WI (US) 53051

( * ) Notice: Subject to any disclaimer, the term of this patent is extended or adjusted under 35 U.S.C. 154(b) by 129 days.

(21) Appl. No.: 12/053,806

(22) Filed: Mar. 24, 2008

(65) Prior Publication Data

US 2008/0264210 A1 Oct. 30, 2008

Related U.S. Application Data

(63) Continuation-in-part of application No. 11/739,794, filed on Apr. 25, 2007, now abandoned.

(51) Int. Cl.
*B29C 73/08* (2006.01)
(52) U.S. Cl. ........................... 81/15.7; 81/15.2
(58) Field of Classification Search .................. 81/15.2, 81/15.7
See application file for complete search history.

(56) References Cited

U.S. PATENT DOCUMENTS

| | | | | |
|---|---|---|---|---|
| 2,866,494 A * | 12/1958 | Sanderson | .................... | 156/97 |
| 3,174,524 A * | 3/1965 | Nitzsche | ...................... | 152/370 |
| 3,257,875 A * | 6/1966 | Chambers et al. | ............ | 81/15.7 |
| 3,783,715 A | 1/1974 | Niconchuk | | |
| 3,785,896 A | 1/1974 | Kassel | | |
| 4,243,089 A * | 1/1981 | Kenney | ....................... | 152/370 |
| 4,479,408 A * | 10/1984 | Niconchuk | .................... | 81/15.7 |
| 4,763,546 A * | 8/1988 | Yeh et al. | ...................... | 81/15.7 |
| 4,930,377 A * | 6/1990 | Lester | ......................... | 81/15.2 |
| 6,170,361 B1 * | 1/2001 | Yates | .......................... | 81/15.7 |
| 7,051,622 B1 * | 5/2006 | Chen | .......................... | 81/15.7 |
| 7,377,197 B1 * | 5/2008 | Lin | .............................. | 81/15.7 |
| 2002/0020254 A1 * | 2/2002 | Pittman | ...................... | 81/15.7 |

* cited by examiner

*Primary Examiner*—David B Thomas
(74) *Attorney, Agent, or Firm*—Donald J. Ersler

(57) ABSTRACT

The tire repair tools preferably includes a rasp tool, an insertion tool and a power tool. The rasp tool preferably includes a modified drill bit and a quick release end. However, the rasp tool may be replaced with a knurled reamer. The quick release end is preferably inserted into a quick chuck. The insertion tool preferably includes a plug retention end, a shank and the quick release end. A plug slot is disposed in the plug retention end. A sealing plug is inserted into the plug slot, similar to a prior art tire repair tool. In a second embodiment, the quick release ends are replaced with a socket end. In a third embodiment, the quick release ends are replaced with a T-handle. The rasp or reamer clean out a tire hole and the insertion tool is used with a power tool, ratchet or T-handle.

10 Claims, 9 Drawing Sheets

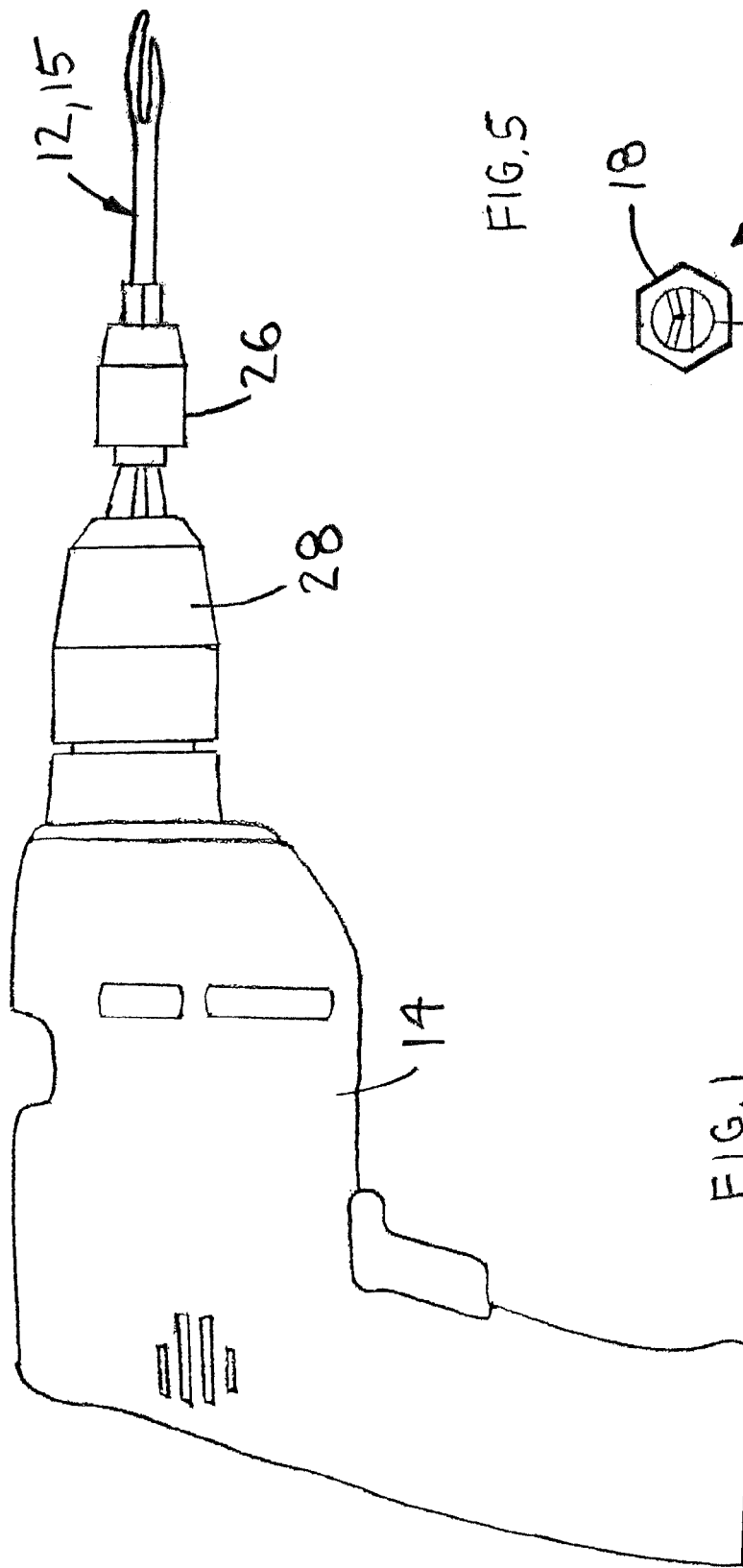

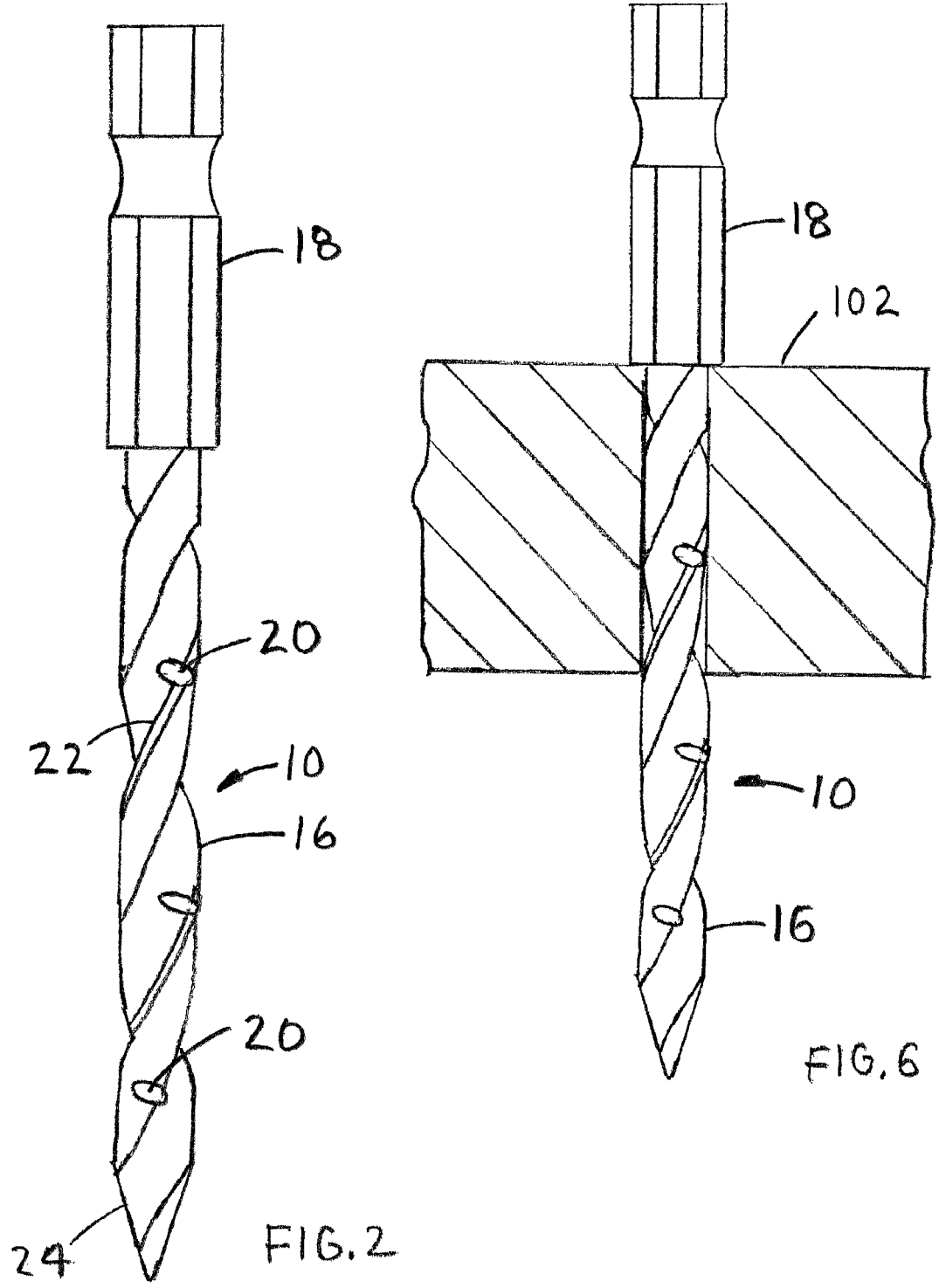

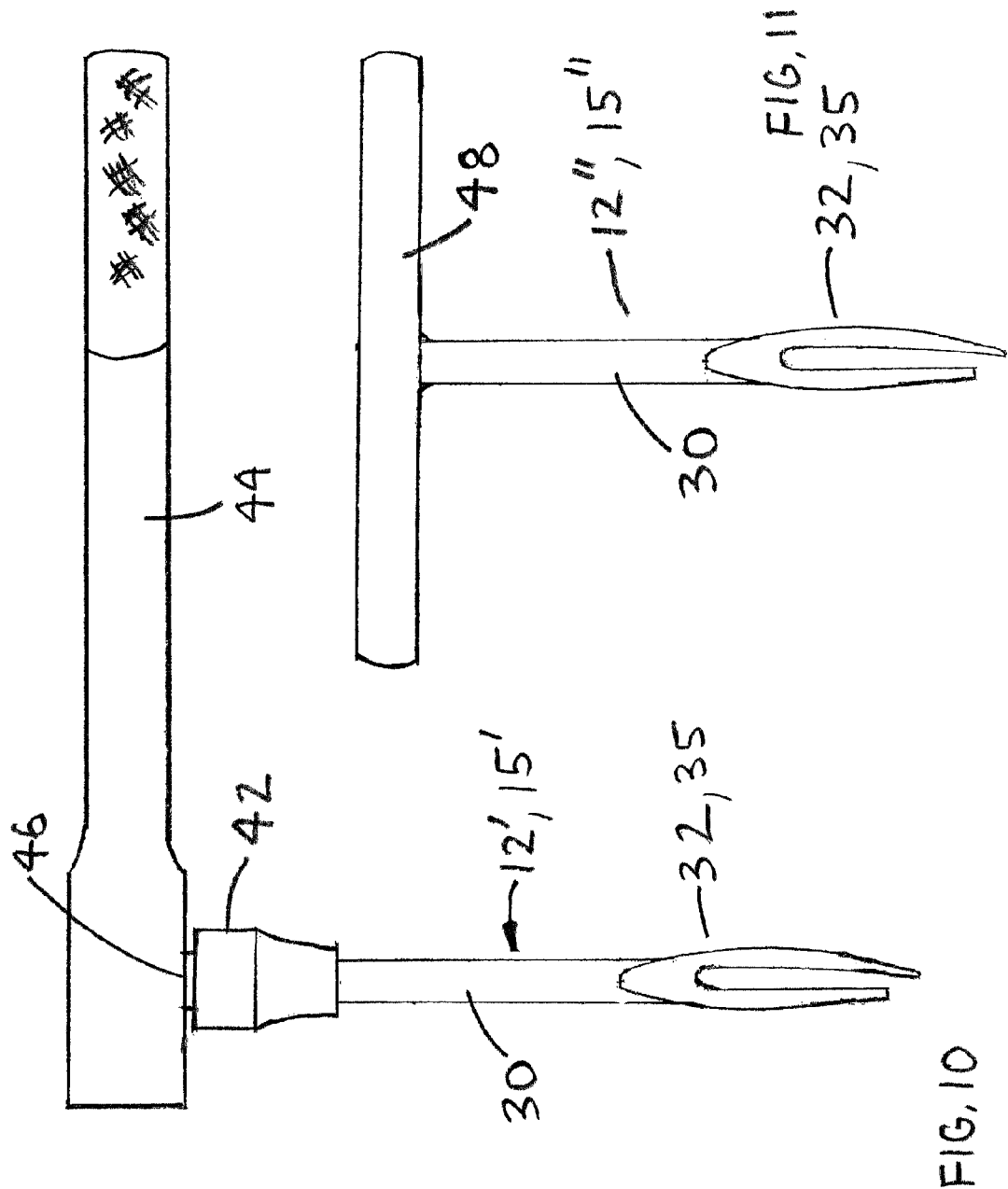

TIRE REPAIR TOOLS

CROSS-REFERENCES TO RELATED APPLICATIONS

This is a continuation-in-part patent application taking priority from nonprovisional application Ser. No. 11/739,794 filed on Apr. 25, 2007 now abandoned.

BACKGROUND OF THE INVENTION

1. Field of the Invention

The present invention relates generally to tire repair with plugs and more specifically to tire repair tools, which require less physical strength to fix a puncture than that of the prior art.

2. Discussion of the Prior Art

There are numerous tire repair devices that use rubber coated plugs to seal a hole in a tubeless tire. Pat. No. 3,783,715 to Niconchuk discloses tire repair tools. The Niconchuk patent includes a tire repair tool for inserting plugging material typically in the form of rubber coated twisted strands, into a tire puncture. The plugging material is threaded into the open eye of a needle forming a part of the tool and inserted into the puncture. The inserting motion is limited by a stop free to rotate on the needle's shank so that the ends of the strand are not drawn into the puncture. Pat. No. 3,785,896 to Kassel discloses a tire puncture repair system. The Kassel patent includes an implement for forming a repair plug and inserting the same into a tire casing to seal a puncture wound. The implement includes an insertion needle having a hook adjacent its free end and a gaff retractable away from the needle. However, both these tools require great physical strength to insert a sealing plug into the puncture in a tire.

Accordingly, there is a clearly felt need in the art for tire repair tools, which do not require great physical strength to insert a sealing plug into a tire; allows the sealing plug to be released from an insertion tool with minimal stress to the sealing plug; and includes a stop to prevent over insertion of the tire repair tools.

SUMMARY OF THE INVENTION

The present invention provides tire repair tools, which require less physical strength to fix a puncture than that of the prior art. The tire repair tools preferably include a rasp tool, an insertion tool and a power tool. The rasp tool preferably includes a modified drill bit and a quick release end. However, the rasp tool may be replaced with a knurled reamer. A plurality of rasp notches are formed on the flutes of the modified drill bit to simulate the function of a rasp tool. An elongated point is formed on one end of the drill bit and the quick release end is formed on the other end thereof. The quick release end is preferably inserted into a quick chuck. The quick chuck is retained in a chuck of a power tool, such as a drill. A perimeter of the modified drill bit is less than the perimeter of the quick release end, such that thereof acts as a stop.

The insertion tool preferably includes a plug retention end, a shank and the quick release end. The plug retention end is formed on one end of the shank and the quick release end is formed on the other end thereof. A perimeter of the shank is less than a perimeter of the quick release end, such that thereof acts as a stop. The plug retention end includes a first projection, a second projection and a plug slot. The plug slot is disposed between the first projection and the second projection. The plug retention end preferably has an alternative design. The alternative plug retention end includes a first projection, a second projection and a plug slot. The plug slot is disposed between the first projection and the second projection. However, the first and second projections do not flex inward toward each other during insertion.

A sealing plug is inserted into the plug slot with a minimum amount of effort. An end of the second projection preferably has a length that is less than that of the first projection. The quick release end is inserted into a quick chuck. The quick chuck is retained in the chuck of the power tool. However, quick release ends of the rasp, the reamer and the insertion tools may also be directly inserted into a chuck of a drill.

In a second embodiment, the quick release ends of the rasp, reamer and insertion tools are replaced with a socket end. The socket end is sized to receive a ratchet projection. In a third embodiment, the quick release ends of the rasp, reamer and insertion tools are replaced with a T-handle.

A method of repairing a tire includes inserting the rasp tool into a tire hole and stroking the rasp tool or knurled reamer in the tire hole several times to produce a clean hole, while rotating in the power tool. Next, the sealing plug is inserted into the plug slot and coated with glue. The insertion tool is then inserted into the tire hole and the power tool actuated intermittently, until the insertion tool is fully inserted into the hole. Finally, the insertion tool is then withdrawn from the hole. The steps used for repairing a tire in the second and third embodiments are similar to that of the first embodiment.

Accordingly, it is an object of the present invention to provide tire repair tools, which do not require great physical strength to insert a sealing plug into a tire.

It is further object of the present invention to provide tire repair tools, which allow the sealing plug to be released from the insertion tool with minimal stress to the sealing plug.

Finally, it is another object of the present invention to provide tire repair tools, which include a stop to prevent over insertion of the tire repair tools.

These and additional objects, advantages, features and benefits of the present invention will become apparent from the following specification.

BRIEF DESCRIPTION OF THE DRAWINGS

FIG. 1 is a side view of a insertion tool retained in a quick chuck and the quick chuck retained in a chuck of a power tool of tire repair tools in accordance with the present invention.

FIG. 2 is a side view of a rasp tool of tire repair tools in accordance with the present invention.

FIG. 5 is a front end view of an insertion tool of the tire repair tools in accordance with the present invention.

FIG. 6 is a side view of a rasp tool fully inserted into a tire puncture of the tire repair tools in accordance with the present invention.

FIG. 10 is a front view of a second embodiment of an insertion tool retained in a ratchet of tire repair tools in accordance with the present invention.

FIG. 11 is a front view of a third embodiment of an insertion tool of tire repair tools in accordance with the present invention.

DETAILED DESCRIPTION OF THE PREFERRED EMBODIMENTS

Figure 3:
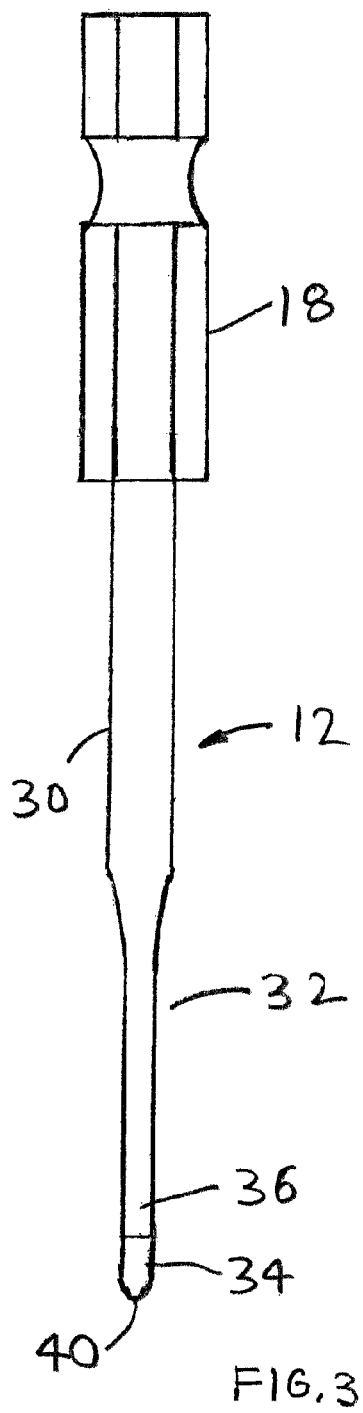
FIG. 3 is a side view of an insertion tool of tire repair tools in accordance with the present invention.
Figure 4:
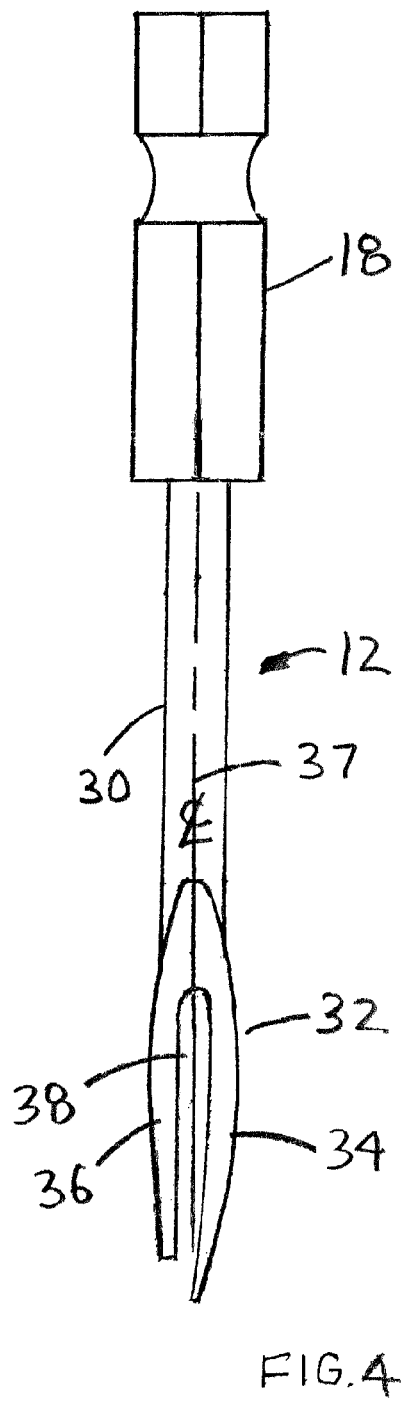
FIG. 4 is a front view of an insertion tool of tire repair tools in accordance with the present invention.
Figure 3A:
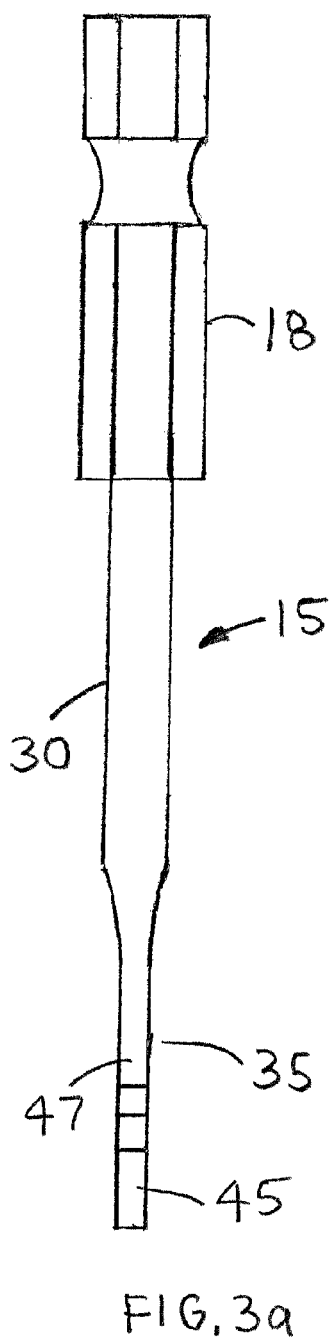
FIG. 3a is a side view of an insertion tool with an alternative plug retention end of tire repair tools in accordance with the present invention.
Figure 4B:
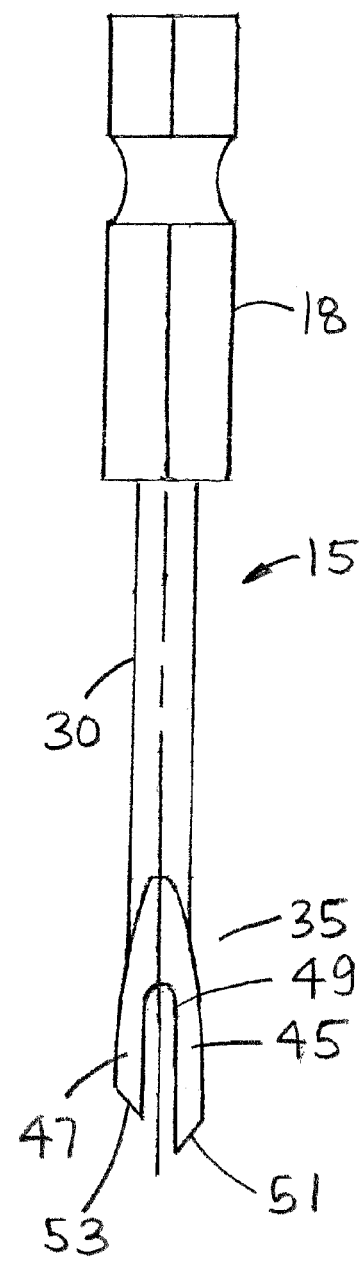
FIG. 4b is a front view of an insertion tool of tire repair tools in accordance with the present invention.

With reference now to the drawings, and particularly to FIG. 1, there is shown a side view of an insertion tool 12 retained in a power tool 14. With reference to FIGS. 2-4, the tire repair tools preferably include a rasp tool 10, the insertion tool 12 and the power tool 14. The power tool 14 is a power drill in FIG. 1. The rasp tool 10 preferably includes a modified drill bit 16 and a quick release end 18. A plurality of rasp notches 20 are preferably formed on the flutes 22 of the modified drill bit 16 to simulate the function of a rasp tool. An elongated point 24 is formed on one end of the drill bit 16 and the quick release end 18 is formed on the other end thereof. However, the rasp tool 10 may be replaced with a knurled reamer 11. The knurled reamer 11 includes a reamer portion 13 and a quick release end 18. The reamer portion 13 includes a knurled surface 17. The reamer portion 13 is well known in the art and need not be explained in further detail. The quick release end 18 is attached to an of the reamer portion 13 by welding or the like.

Figures 2A, 6A:
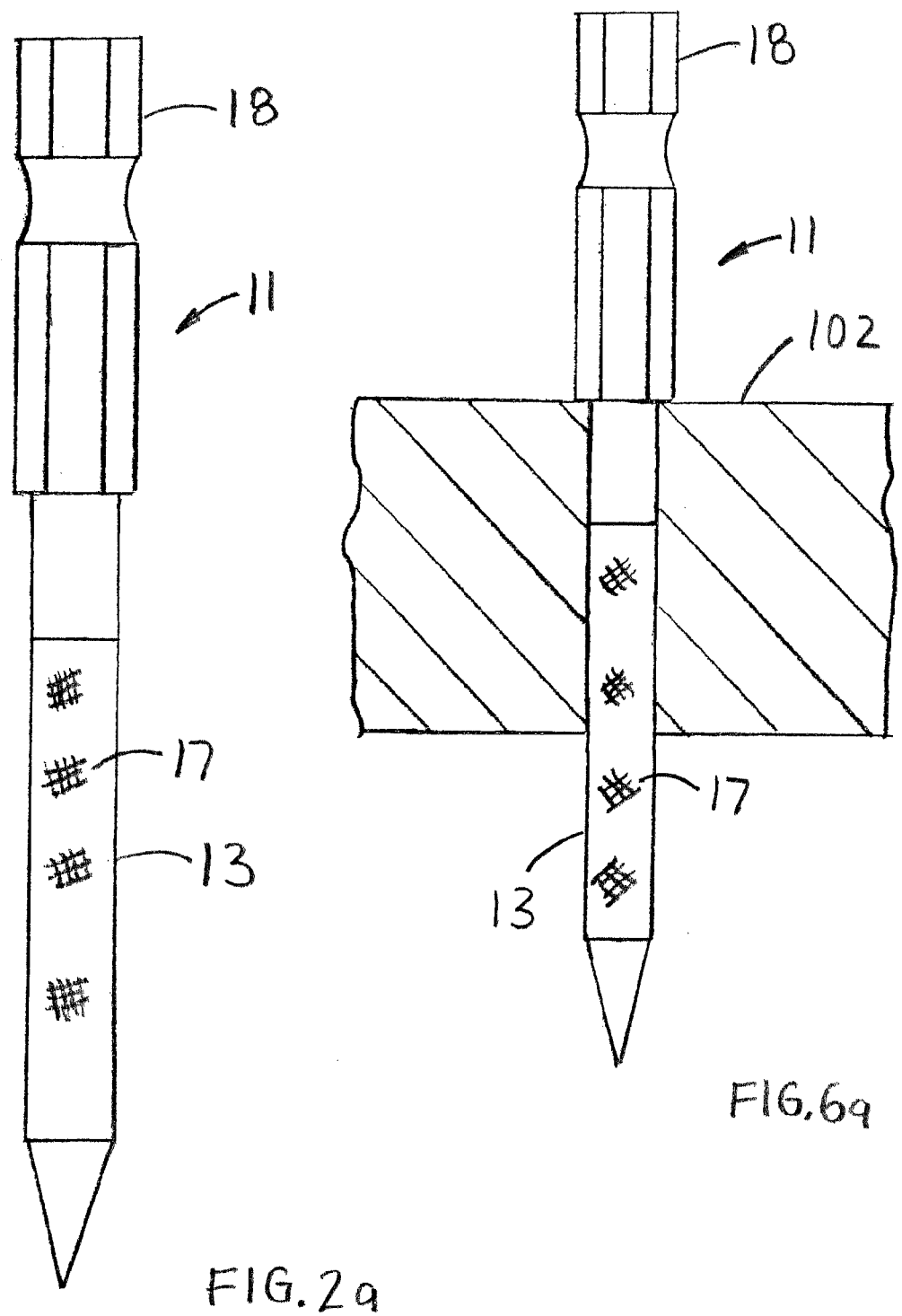
FIG. 2a is a side view of a knurled reamer of tire repair tools in accordance with the present invention.
FIG. 6a is a side view of a knurled reamer fully inserted into a tire puncture of the tire repair tools in accordance with the present invention.

With reference to FIG. 6, a perimeter of the modified drill bit 16 is less than a perimeter of the quick release end 18 to act as a stop for insertion into a tire 102. The quick release end 18 preferably is sized and shaped to be received by a quick chuck 26 having an internal hex receiver. However, other quick chucks may also be used. The quick release end 18 may also be directly inserted into a chuck 28 of the power tool 14, such as a drill. Quick chucks are well known in the art and need not be explained in further detail. With reference to FIG. 6a, a perimeter of the reamer portion 13 is less than a perimeter of the quick release end 18 to act as a stop for insertion into a tire 102.

Figure 8:
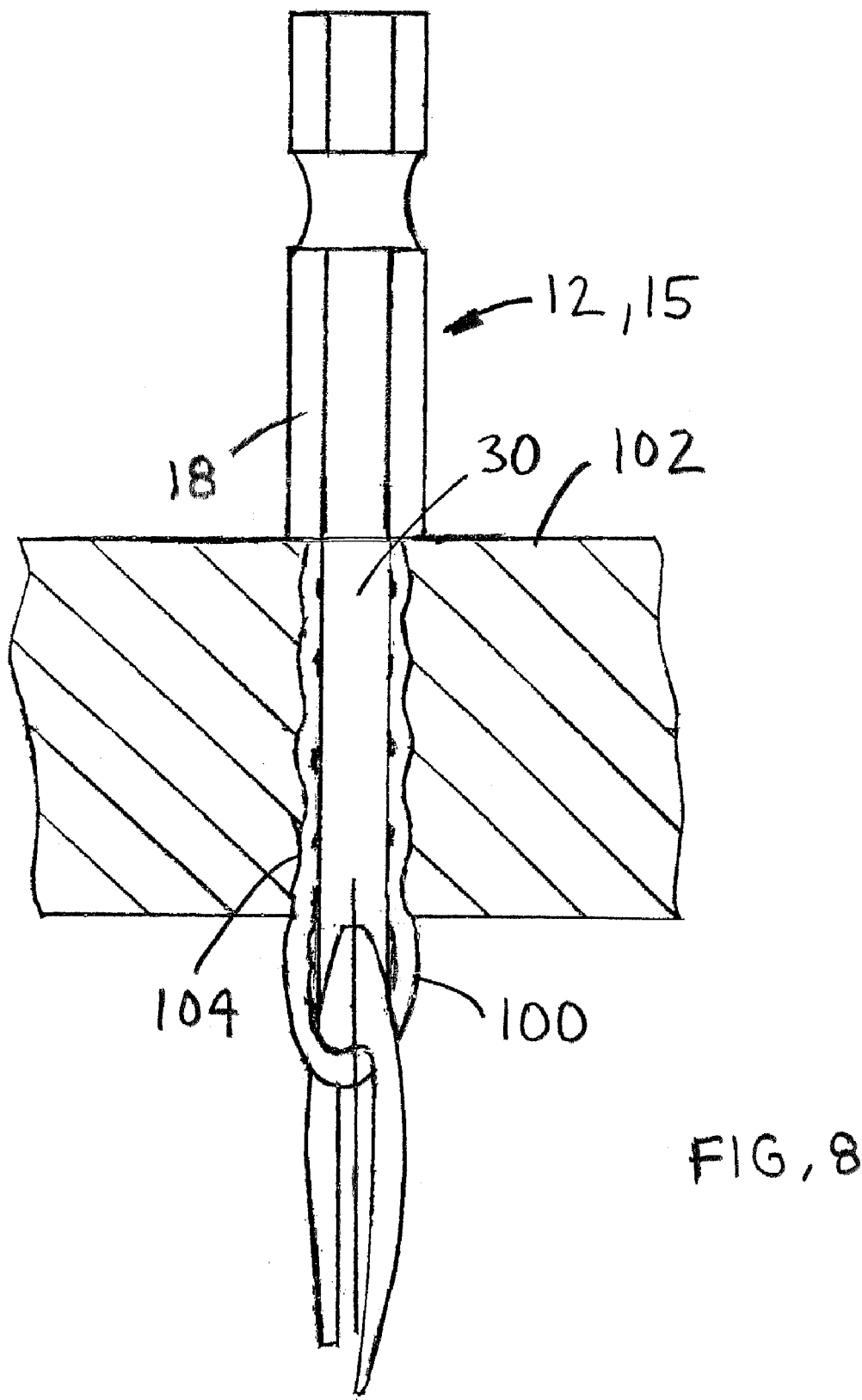
FIG. 8 is a front view of an insertion tool retaining a sealing plug, fully inserted into a tire puncture of a tire repair tool in accordance with the present invention.

With reference to FIG. 5, the insertion tool 12 preferably includes a shank 30, a plug retention end 32 and the quick release end 18. The plug retention end 32 is formed on one end of the shank 30 and the quick release end 18 is formed on the other end thereof. With reference to FIG. 8, a perimeter of the shank 30 is less than a perimeter of the quick release end 18 to act as a stop. An insertion tool 15 preferably includes a shank 30, a plug retention end 35 and the quick release end 18. The plug retention end 35 is formed on one end of the shank 30 and the quick release end 18 is formed on the other end thereof. With reference to FIG. 8, a perimeter of the shank 30 is less than a perimeter of the quick release end 18 to act as a stop.

Figure 4A:
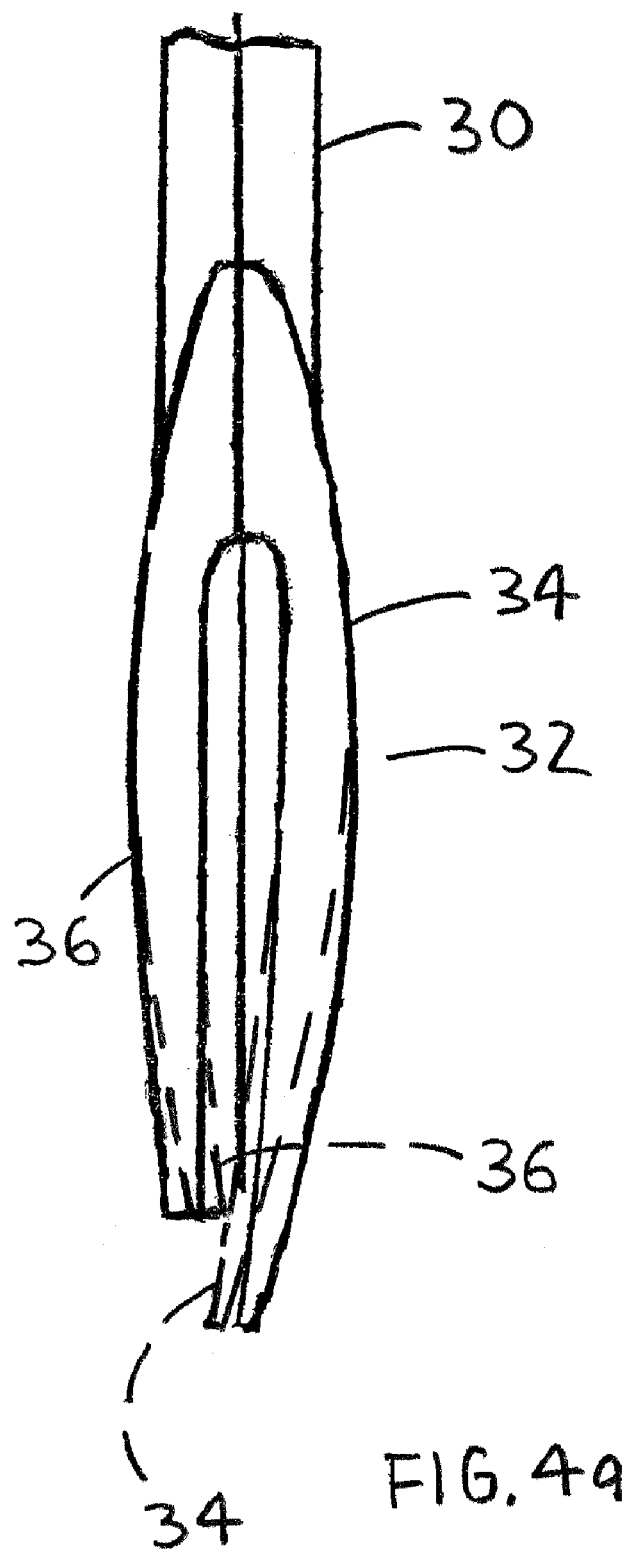
FIG. 4a is an enlarged front view of a plug retention end of an insertion tool of tire repair tools in accordance with the present invention.
Figure 7:
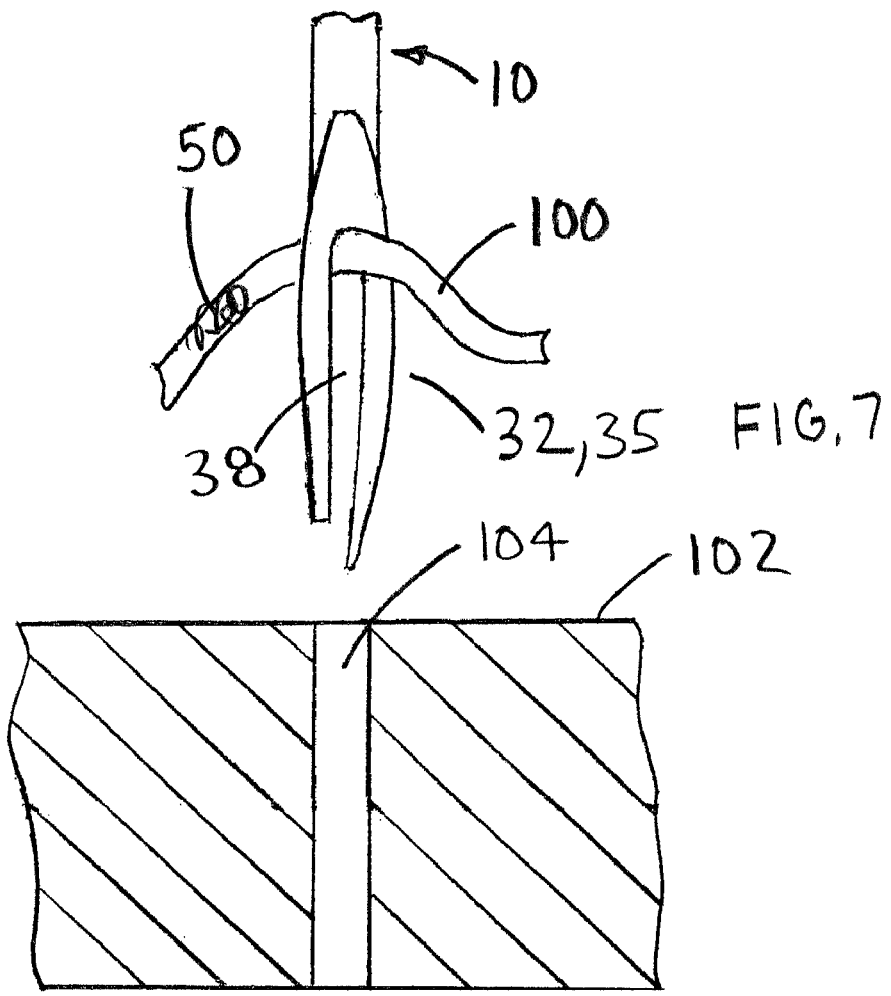
FIG. 7 is a front view of an insertion tool retaining a sealing plug above a tire puncture of a tire repair tool in accordance with the present invention.
Figure 9:
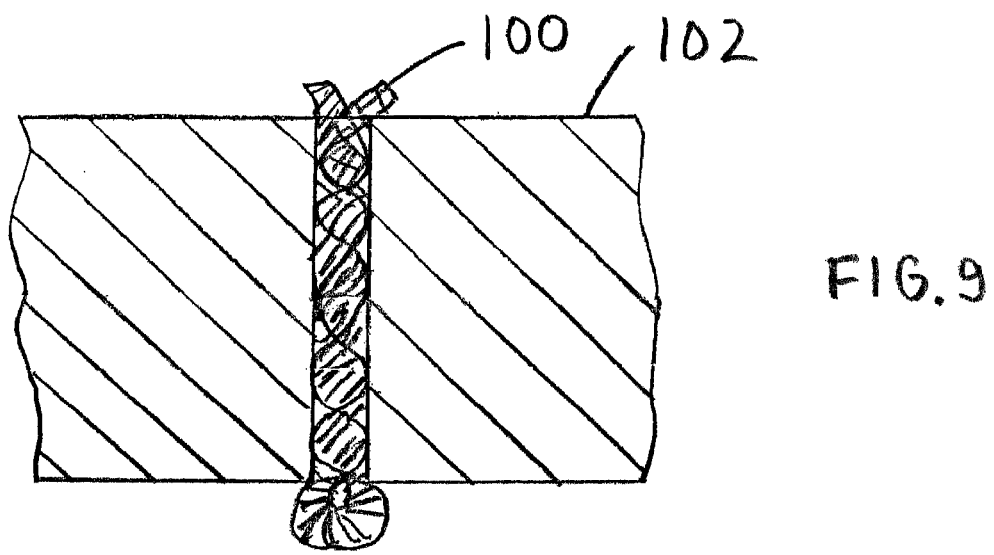
FIG. 9 is a cross sectional side view of a sealing plug retained in a tire puncture of a tire repair tool in accordance with the present invention.

The plug retention end 32 includes a first projection 34, a second projection 36 and a plug slot 38. The plug slot 38 is disposed between the first projection 36 and the second projection 38. One end of the plug slot 38 on substantially a center of a centerline 37. A width of the plug retention end 32 is greater than a diameter or thickness of the shank 30. A thickness of the plug retention end 32 is less than the diameter or thickness of the shank 30. The first projection 36 preferably includes a substantially curved outer surface. An inner surface of the first projection 34 preferably curves toward the centerline 37 of the shank 30. The first projection 34 preferably comes to a point 40. A length of the first projection 34 is preferably longer than a length of the second projection 36. The plug slot 38 is sized to receive a sealing plug 100. With reference to FIG. 4a, it is preferable that the first projection 34 and the second projection 36 flex inward toward each other, when inserted into a tire hole 104 of a tire 102.

The plug retention end 35 includes a first projection 45, a second projection 47 and a plug slot 49. The plug slot 49 is disposed between the first projection 45 and the second projection 47. A width of the plug retention end 35 is greater than a diameter or thickness of the shank 30. A thickness of the plug retention end 35 is less than a diameter or thickness of the shank 30. The first projection 45 is terminated with a first chamfer or radius 51. A length of the first projection 45 is preferably longer than a length of the second projection 47. The second projection 47 is terminated with a second chamfer or radius 53. The plug slot 38, 49 are sized to receive a sealing plug 100. With reference to FIG. 4a, it is preferable that the first projection 34 and the second projection 36 flex inward toward each other, when inserted into a tire hole 104 of the tire 102. However, the first projection 45 and the second projection 47 do not flex inward toward each other, when inserted into the tire hole 104 of the tire 102.

With reference to FIG. 10, a second embodiment of the tire repair tools includes replacing the quick release ends 18 of the the rasp tool 10, the insertion tool 12, the knurled reamer 13 and the insertion tool 15 with a socket end 42. The socket end 42 is sized to be received by a ratchet projection 46 of a ratchet 44. The second embodiment of the insertion tool 12', 15' is shown in FIG. 10. With reference to FIG. 11, a third embodiment of the tire repair tools includes replacing the quick release ends 18 of the rasp tool 10, the insertion tool 12, the knurled reamer 13 and the insertion tool 15 with a T-handle 48. The T-handle 44 is attached to a shank 30 of the insertion tool 12", 15" in FIG. 11.

A method of repairing a tire includes inserting the rasp tool 10 or the knurled reamer 13 into the tire hole 104 of the tire 102 and stroking the rasp tool 10 or the knurled reamer 13 in the tire hole 104 several times to produce a clean hole, while rotating in the power tool 14. Next, the sealing plug 100 is inserted into the plug slot 38, 49 of the insertion tool 12, 15 and coated with glue 50. The insertion tool 12 is then inserted into the tire hole 104 and the power tool 14 actuated intermittently, until the insertion tool 12, 15 is fully inserted into the tire hole 104. Finally, the insertion tool 12, 15 is then withdrawn from the tire hole 104 without rotating the insertion tool 12, 15. The steps used for repairing a tire in the second and third embodiments are similar to that of the first embodiment. Rotation of the rasp or reamer and insertion tools is implemented with the ratchet 44 or the T-handle 48. The power tool 14, the ratchet 44 and the T-handle provide 48 provide leverage for operating the rasp tool 10 or the knurled reamer 13 and the insertion tool 12, 15.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A tire repair tool, comprising:
a shank having a centerline;
a plug retention end being formed on one end of said shank, said plug retention end including a first projection and a second projection, a plug slot being created between said first projection and said second projection, said plug slot including a first inner wall of said first projection and a second inner wall of said second projection, said first inner wall having a distal end and a tipped end, said tipped end of said first inner wall being disposed on substantially said centerline, said end of said first inner wall flexes toward said second inner wall and crosses said centerline when inserted into a tire hole; and
said second inner wall having a second distal end and a second tipped end, said second tipped end flexes and contacts said first inner wall when inserted into the tire hole.

2. The tire repair tool of claim 1, further comprising:
a quick release end being formed on the other end of said shank.

3. The tire repair tool of claim 1, wherein:
said quick release end being retained in a power tool.

4. The tire repair tool of claim 1, wherein:
a length of said first projection being greater than a length of said second projection.

5. The tire repair tool of claim 1, wherein:
said second inner wall being substantially straight and substantially parallel to said centerline.

6. A tire repair tool, comprising:
a shank having a centerline; and
a plug retention end being formed on one end of said shank, said plug retention end including a first projection and a second projection, a plug slot being created between said first projection and said second projection, said plug slot including a first inner wall of said first projection and a second inner wall of said second projection, said first inner wall having a distal end and a tipped end, said tipped end of said first inner wall being disposed on substantially said centerline, said second inner wall being substantially straight and substantially parallel to said centerline, said tipped end of said first inner wall flexes toward said second inner wall and crosses said centerline when inserted into a tire hole, a thickness of said shank being greater than a thickness of said first projection and said second projection; and
said second inner wall having a second distal end and a second tipped end, said second tipped end flexes and contacts said first inner wall when inserted into the tire hole.

7. The tire repair tool of claim 6, further comprising:
a quick release end being formed on the other end of said shank.

8. The tire repair tool of claim 7, wherein:
said quick release end being retained in a power tool.

9. The tire repair tool of claim 6, further comprising:
a socket end being formed on the other end of said shank.

10. The tire repair tool of claim 6, wherein:
a length of said first projection being greater than a length of said second projection.

* * * * *